United States Patent
Sakakibara et al.

(10) Patent No.: US 6,525,779 B1
(45) Date of Patent: Feb. 25, 2003

(54) TELEVISION RECEIVER FOR RECEIVING TWO DIFFERENT BROADCAST FORMS

(75) Inventors: Shigeto Sakakibara, Osaka (JP); Hiroki Nakamura, Osaka (JP)

(73) Assignee: Funai Electric Co. Ltd., Daito (JP)

( * ) Notice: Subject to any disclaimer, the term of this patent is extended or adjusted under 35 U.S.C. 154(b) by 0 days.

(21) Appl. No.: 09/465,943

(22) Filed: Dec. 17, 1999

(30) Foreign Application Priority Data

Dec. 21, 1998 (JP) ............................................ 10-010134

(51) Int. Cl.7 ............................. H04N 5/46; H04N 5/50
(52) U.S. Cl. ...................... 348/558; 348/570; 348/716; 348/731; 348/735
(58) Field of Search .............................. 348/553, 555, 348/558, 569, 570, 705, 706, 715, 716, 717, 718, 719, 731, 732, 733–735; 725/151; H04N 5/46, 5/50

(56) References Cited

U.S. PATENT DOCUMENTS

| | | | | | |
|---|---|---|---|---|---|
| 5,087,977 | A | * | 2/1992 | Suizu | 348/732 |
| 5,193,005 | A | * | 3/1993 | Tomita | 348/731 |
| 5,479,214 | A | * | 12/1995 | Sakakibara et al. | 348/558 |
| 5,594,510 | A | * | 1/1997 | Sakakibara | 348/731 |
| 5,978,050 | A | * | 11/1999 | Lee | 348/570 |
| 6,064,449 | A | * | 5/2000 | White et al. | 348/554 |
| 6,297,858 | B1 | * | 10/2001 | Yang | 348/192 |
| 6,359,580 | B1 | * | 3/2002 | Morrison | 348/731 |
| 6,400,422 | B1 | * | 6/2002 | Nakamura | 348/553 |

FOREIGN PATENT DOCUMENTS

| JP | 6-326935 | 11/1994 |
|---|---|---|
| JP | 7-87415 | 3/1995 |
| JP | 3013753 | 5/1995 |
| JP | 8-79645 | 3/1996 |
| JP | 8-195916 | 7/1996 |

* cited by examiner

Primary Examiner—John Miller
Assistant Examiner—Brian Yenke
(74) Attorney, Agent, or Firm—Crowell & Moring, LLP

(57) ABSTRACT

A television receiver, in which if a tuner can receive a signal of the television broadcast form of either television wave broadcasting or CATV broadcasting, a microcomputer executes channel preset processing so that signals of television wave broadcasting can also be received although the processing is predicated on CATV broadcasting, then determines signals of which television broadcast form can be received. If the microcomputer determines that the signals of the television wave broadcasting can be received, it makes a reference to the memory positions of the preset contents. To cause the tuner to receive a station-existing channel, the microcomputer matches the target memory position with the channel of television wave broadcasting for receiving the channel.

6 Claims, 6 Drawing Sheets

FIG. 2

| CHNL IND | TV (MHz) | CATV NORMAL (MHz) | CHNL IND | TV (MHz) | CATV NORMAL (MHz) | CHNL IND | TV (MHz) | CATV NORMAL (MHz) |
|---|---|---|---|---|---|---|---|---|
| 1 | - | 73.25 | 51 | 693.25 | 385.25 | 100 | | 649.25 |
| 2 | 55.25 | 55.25 | 52 | 699.25 | 391.25 | 101 | | 655.25 |
| 3 | 61.25 | 61.25 | 53 | 705.25 | 397.25 | 102 | | 661.25 |
| 4 | 67.25 | 67.25 | 54 | 711.25 | 403.25 | 103 | | 667.25 |
| 5 | 77.25 | 77.25 | 55 | 717.25 | 409.25 | 104 | | 673.25 |
| 6 | 83.25 | 83.25 | 56 | 723.25 | 415.25 | 105 | | 679.25 |
| 7 | 175.25 | 175.25 | 57 | 729.25 | 421.25 | 106 | | 685.25 |
| 8 | 181.25 | 181.25 | 58 | 735.25 | 427.25 | 107 | | 691.25 |
| 9 | 187.25 | 187.25 | 59 | 741.25 | 433.25 | 108 | | 697.25 |
| 10 | 193.25 | 193.25 | 60 | 747.25 | 439.25 | 109 | | 703.25 |
| 11 | 199.25 | 199.25 | 61 | 753.25 | 445.25 | 110 | | 709.25 |
| 12 | 205.25 | 205.25 | 62 | 759.25 | 451.25 | 111 | | 715.25 |
| 13 | 211.25 | 211.25 | 63 | 765.25 | 457.25 | 112 | | 721.25 |
| 14 | 471.25 | 121.25 | 64 | 771.25 | 463.25 | 113 | | 727.25 |
| 15 | 477.25 | 127.25 | 65 | 777.25 | 469.25 | 114 | | 733.25 |
| 16 | 483.25 | 133.25 | 66 | 783.25 | 475.25 | 115 | | 739.25 |
| 17 | 489.25 | 139.25 | 67 | 789.25 | 481.25 | 116 | | 745.25 |
| 18 | 495.25 | 145.25 | 68 | 795.25 | 487.25 | 117 | | 751.25 |
| 19 | 501.25 | 151.25 | 69 | 801.25 | 493.25 | 118 | | 757.25 |
| 20 | 507.25 | 157.25 | 70 | | 499.25 | 119 | | 763.25 |
| 21 | 513.25 | 163.25 | 71 | | 505.25 | 120 | | 769.25 |
| 22 | 519.25 | 169.25 | 72 | | 511.25 | 121 | | 775.25 |
| 23 | 525.25 | 217.25 | 73 | | 517.25 | 122 | | 781.25 |
| 24 | 531.25 | 223.25 | 74 | | 523.25 | 123 | | 787.25 |
| 25 | 537.25 | 229.25 | 75 | | 529.25 | 124 | | 793.25 |
| 26 | 543.25 | 235.25 | 76 | | 535.25 | 125 | | 799.25 |
| 27 | 549.25 | 241.25 | 77 | | 541.25 | | | |
| 28 | 555.25 | 247.25 | 78 | | 547.25 | | | |
| 29 | 561.25 | 253.25 | 79 | | 553.25 | | | |
| 30 | 567.25 | 259.25 | 80 | | 559.25 | | | |
| 31 | 573.25 | 269.25 | 81 | | 565.25 | | | |
| 32 | 579.25 | 271.25 | 82 | | 571.25 | | | |
| 33 | 585.25 | 277.25 | 83 | | 577.25 | | | |
| 34 | 591.25 | 283.25 | 84 | | 583.25 | | | |
| 35 | 597.25 | 289.25 | 85 | | 589.25 | | | |
| 36 | 603.25 | 295.25 | 86 | | 595.25 | | | |
| 37 | 609.25 | 301.25 | 87 | | 601.25 | | | |
| 38 | 615.25 | 307.25 | 88 | | 607.25 | | | |
| 39 | 621.25 | 313.25 | 89 | | 613.25 | | | |
| 40 | 627.25 | 319.25 | 90 | | 619.25 | | | |
| 41 | 633.25 | 325.25 | 91 | | 625.25 | | | |
| 42 | 639.25 | 331.25 | 92 | | 631.25 | | | |
| 43 | 645.25 | 337.25 | 93 | | 637.25 | | | |
| 44 | 651.25 | 343.25 | 94 | | 643.25 | | | |
| 45 | 657.25 | 349.25 | 95 | | 91.25 | | | |
| 46 | 663.25 | 355.25 | 96 | | 97.25 | | | |
| 47 | 669.25 | 361.25 | 97 | | 103.25 | | | |
| 48 | 675.25 | 367.25 | 98 | | 109.25 | | | |
| 49 | 681.25 | 373.25 | 99 | | 115.25 | | | |
| 50 | 687.25 | 379.25 | | | | | | |

TELEVISION RECEIVER FOR RECEIVING TWO DIFFERENT BROADCAST FORMS

BACKGROUND OF THE INVENTION

1. Field of the Invention

This invention relates to a television receiver and in particular to a television receiver that can receive television broadcast signals in response to two different television broadcast forms.

2. Description of the Related Art

Hitherto, as an example of this kind of television receiver, a television receiver that can selectively receive either of TV (television wave) broadcasting and CATV (cable television) broadcasting has been known. Since they differ in assigned channel frequencies, if which television broadcasting is to be received is not previously known, the channel frequencies are not known either, thus the user needs to set a predetermined changeover switch in response to the television broadcasting to be received.

However, setting a changeover switch as mentioned above is burdensome for the user and television broadcasting cannot normally be received in some cases because of erroneous setting. Thus, various configurations for a television receiver to determine which television broadcasting can be received and for executing internal setting based on the determination result have been developed.

As an example, Japanese Patent Unexamined Publication No. Hei. 6-326935 discloses the following configuration: Attention is focused on the fact that CATV broadcasting channels are assigned to a specific frequency band to which TV broadcasting channels are not assigned, and a presearch is made for a CATV broadcasting channel on the specific frequency band, whereby which of CATV broadcasting and TV broadcasting can be received is determined. Channel presetting is executed in response to the determination result and channel selection control is performed based on the channel presetting contents.

The conventional television receiver described above involves the following problem:

Surely, setting a changeover switch is not necessary for user's convenience and a case in which television broadcasting cannot normally be received because of erroneous setting cannot occur. However, after a presearch is made for a CATV broadcasting channel on the specific frequency band, channel presetting is newly executed, thus it takes time in the channel presetting in some cases.

SUMMARY OF THE INVENTION

It is therefore an object of the invention to provide a television receiver that can decrease the time required for channel presetting while determining which television broadcast form can be received if television broadcast signals can be received in response to two television broadcast forms.

To achieve the above object, according to the invention, there is provided a television receiver comprising: signal reception means for receiving and outputting a signal of any desired frequency in response to a first television broadcast form in which predetermined channel frequencies are assigned and a second television broadcast form in which channel frequencies are assigned to a specific frequency band not assigned in the first television broadcast form although the same channel frequencies as or channel frequencies close to the channel frequencies assigned to the first television broadcast form are assigned; reception instruction means for instructing the signal reception means to receive a signal of each channel frequency in response to the second television broadcast form; station existence determination means for roughly continuously changing the reception frequency of the signal reception means on a frequency band containing the channel frequencies in the first television broadcast form close to each channel frequency specified by the reception instruction means and determining whether or not a station exists based on the output; channel memory means having as many memory positions as the number of channels in the second television broadcast form for storing the determination result of the station existence determination means in the corresponding memory position; television broadcast form determination means for determining which of a signal in the first television broadcast form and a signal in the second television broadcast form can be received based on the determination result of the station existence determination means as to each channel within the specific frequency band assigned only to the second television broadcast form after completion of storage processing for all memory positions in the channel memory means; and reception control means, to cause the signal reception means to receive a station-existing channel based on the storage contents of the channel memory means, if the television broadcast form determination means determines that a signal in the first television broadcast form can be received, the reception control means matching the station-existing channel with the channel in the first television broadcast form and causing the signal reception means to receive the channel.

In the television receiver configured above, a signal of either of the first television broadcast form in which predetermined channel frequencies are assigned and the second television broadcast form in which channel frequencies are assigned to a specific frequency band not assigned in the first television broadcast form although the same channel frequencies as or channel frequencies close to the channel frequencies assigned to the first television broadcast form are assigned can be received. At the initial introduction time, etc., channel presetting is executed before the television receiver is used. In the channel presetting, if the reception instruction means instructs the signal reception means to receive a signal of each channel frequency in response to the second television broadcast form, the signal reception means receives the signals of the channel frequencies in sequence based on the instruction. At this time, the station existence determination means roughly continuously changes the reception frequency of the signal reception means on a frequency band containing the channel frequencies in the first television broadcast form close to each channel frequency and determines whether or not a station exists based on the output. On the other hand, the channel memory means has as many memory positions as the number of channels in the second television broadcast form for storing the determination result of the station existence determination means in the corresponding memory position.

Upon completion of storage processing for all memory positions in the second television broadcast form in the channel memory means, the television broadcast form determination means determines which of a signal in the first television broadcast form and a signal in the second television broadcast form can be received based on the determination result of the station existence determination means as to each channel within the specific frequency band assigned only to the second television broadcast form. The reception control means causes the signal reception means to receive a station-existing channel based on the storage contents of the channel memory means. At this time, if the television broadcast form determination means determines that a signal in the first television broadcast form can be received, the reception control means matches the station-existing channel with the channel in the first television broadcast form and causes the signal reception means to receive the channel.

That is, the station existence determination means determines whether or not a station exists based on the channel frequency in the second television broadcast form; it determines whether or not a station exists on the frequency band containing the channel frequencies in the first television broadcast form close to each channel frequency in the second television broadcast form. Therefore, if the signals only in the first television broadcast form can be received, a station-existing channel frequency is detected. However, since the memory position in which the station-existing channel is stored is predicated on the second television broadcast form, no memory position consistency may occur between the first and second television broadcast forms. Then, the reception control means matches the station-existing channel with the channel in the first television broadcast form and causes the signal reception means to receive the channel.

BRIEF DESCRIPTION OF THE DRAWINGS

In the accompanying drawings:

FIG. 2 is a diagram to show TV and CATV broadcast channel plans in a table form;

DETAILED DESCRIPTION OF THE PREFERRED EMBODIMENT

Referring now to the accompanying drawings, there is shown an embodiment of the invention.

Figure 1:
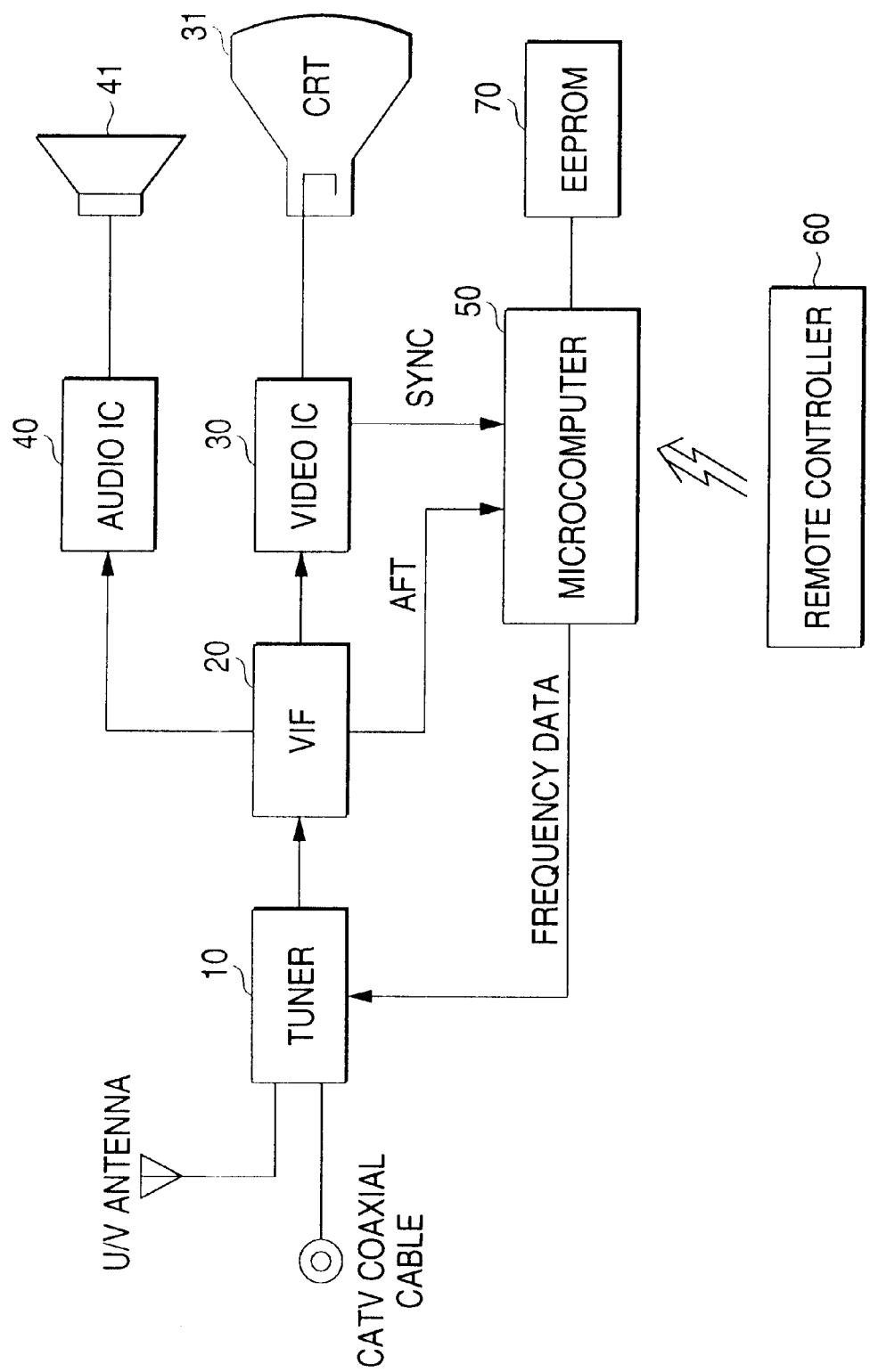
FIG. 1 is a schematic block diagram to show the configuration of a television receiver according to an embodiment of the invention.

FIG. 1 is a schematic block diagram to show a television set incorporating a television receiver according to the embodiment of the invention.

In the figure, a tuner 10, to which either a U/V antenna or a CATV (NORMAL) coaxial cable can be connected as an input source of television broadcast signals, receives any desired frequency signals corresponding to both television broadcast bands, selects only a necessary signal from the received signals, high-frequency amplifies the signal, converts the amplified signal into an intermediate-frequency signal, and outputs the intermediate-frequency signal. The tuner 10 in the embodiment adopts a channel selection mechanism of so-called PLL system and directly controls a local oscillation frequency based on input of predetermined frequency data, thereby making it possible to control reception frequency.

The intermediate-frequency signal output from the tuner 10 undergoes video intermediate-frequency amplification in a VIF circuit 20 and the resultant signal is output to a video IC 30. An audio intermediate-frequency signal is taken out as a second audio intermediate-frequency signal in the process of the video intermediate-frequency amplification and is FM-detected in an audio IC 40, then amplified appropriately and the resultant signal is supplied to a loudspeaker 41.

On the other hand, the video IC 30 video-detects the input video intermediate-frequency amplified signal, then separates horizontal and vertical synchronizing signals based on the detection output and supplies the signals to predetermined horizontal and vertical output stages. The VIF circuit 20 generates an AFT voltage responsive to the difference between actual video carrier frequency and reference frequency. The AFT voltage and the synchronizing signals separated by the video IC 30 are supplied to a microcomputer 50.

The microcomputer 50 can supply frequency data to the tuner 10 and controls the reception frequencies of the tuner 10. More specifically, if a remote controller 60 is operated so as to receive any desired channel, an infrared remote control signal corresponding to the channel is sent. The microcomputer 50 receives the infrared remote control signal through an infrared remote control signal reception section (not shown) and sends frequency data to the tuner 10 so as to receive the corresponding channel. Of course, the TV broadcasting and CATV broadcasting differ in channel plan as shown in FIG. 2 and thus it is necessary to send the corresponding frequency data in response to the television broadcast form to be received. Then, in the embodiment, TV and CATV broadcast channel plans shown in FIG. 2 are stored on a predetermined storage medium and the microcomputer 50 selects the corresponding channel plan in response to the television broadcast form to be received and uses the channel plan for channel selection control.

Figure 3:
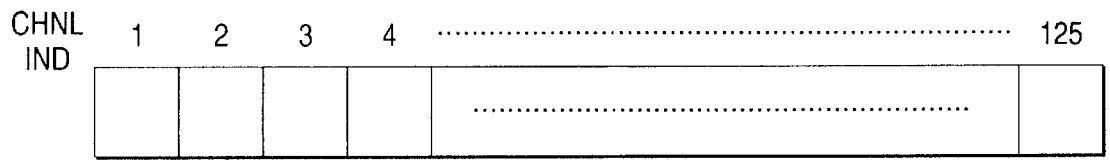
FIG. 3 is a diagram to describe memory positions.

By the way, an actual television broadcast signal does not always exist on each channel frequency regardless of TV broadcasting or CATV broadcasting. Thus, in the embodiment, a so-called channel preset function is provided for previously storing station-existing channels on which a television broadcast signal exists and allowing a channel to be selected based on the storage contents. In the embodiment, a storage area of an EEPROM 70 provides memory positions corresponding to channel numbers (CHNL IND) of 1 to 125 as shown in FIG. 3, and station existence is stored in the memory position of each station-existing channel by channel preset processing of the microcomputer 50. Next, the channel preset processing will be discussed in detail.

To perform channel presetting, a channel presetting command is given, for example, by depressing an operation button (not shown) of the remote controller 60. Then, an infrared remote control signal is sent from the remote controller 60 and the microcomputer 50 senses the signal and performs the channel preset processing according to flowcharts shown in FIGS. 4 and 5.

Figure 4:
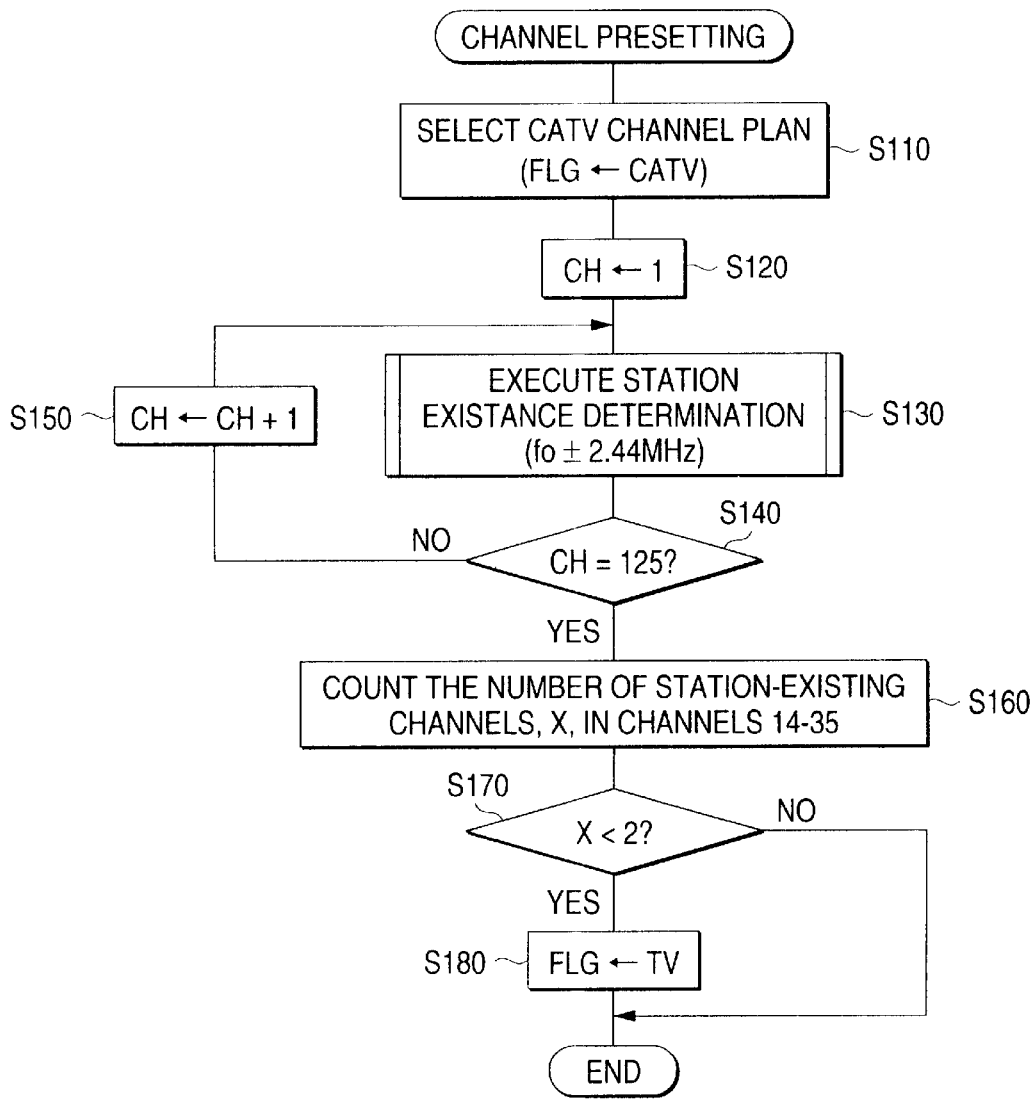
FIG. 4 is a flowchart to show a channel preset processing procedure.

In FIG. 4, first at step S110, the CATV broadcast channel plan is selected and CATV broadcasting is set on a predetermined flag (FLG) and is stored in the EEPROM 70. At step S110, processing such as initializing all memory positions of the EEPROM 70 is executed although not shown. Then, at step S120, 1 is set in a predetermined channel variable (CH) and at step S130, station existence determination processing is executed.

Figure 5:
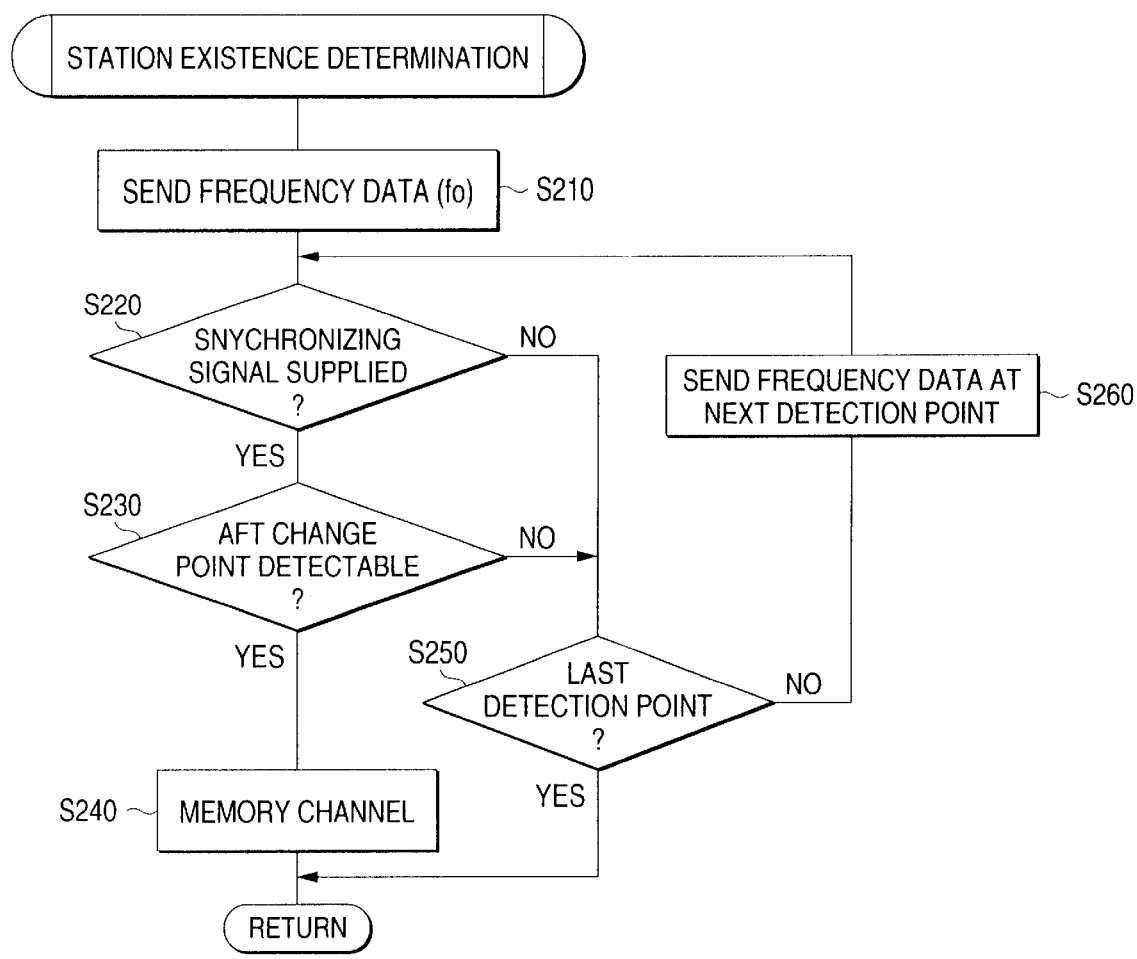
FIG. 5 is a flowchart to show a station existence determination processing procedure.

FIG. 5 is a flowchart to show the station existence determination processing.

In the figure, at step S210, the CATV broadcast channel plan is referenced, the channel frequency corresponding to the channel number set in the channel variable is sensed, and the corresponding frequency data (center frequency f0) is sent to the tuner 10. Then, for the tuner 10 to tune to the corresponding channel frequency, if a television broadcast signal exists on the channel frequency, the video IC 30 becomes able to separate synchronizing signals and supplies the synchronizing signal to the microcomputer 50. Then, at step S220, whether or not the synchronizing signal is supplied from the video IC 30 is determined. If the synchronizing signal is supplied, control goes to step S230 at which AFT change point detection processing is executed and whether or not an AFT change point can be detected is determined.

Figure 6:
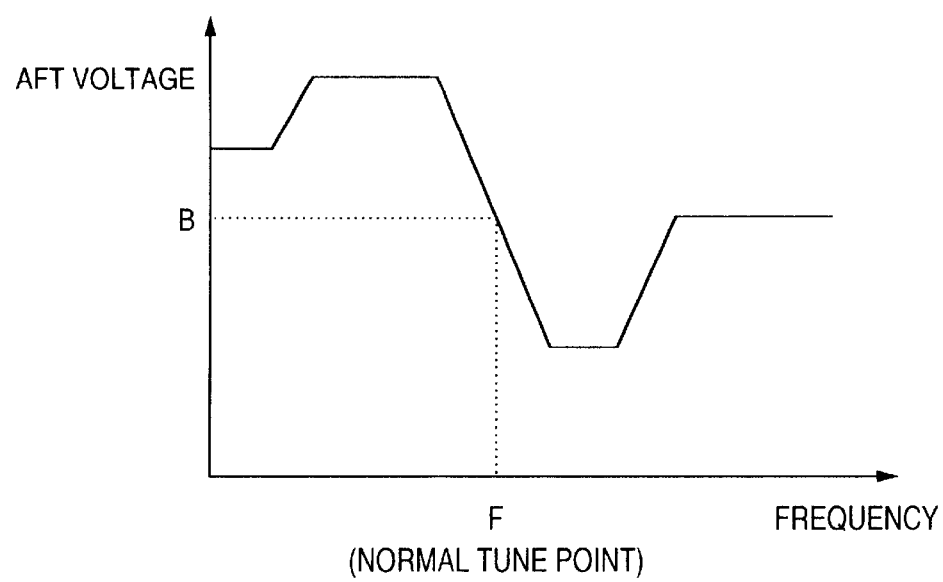
FIG. 6 is a waveform diagram to show the voltage characteristic of AFT voltage.

Before the AFT change point detection processing is described, the voltage characteristic of the AFT voltage will be described. As shown in FIG. 6, the AFT voltage has a voltage characteristic shaped like an inverse S letter with normal tune point F as the center, and the AFT voltage becomes B voltage at the normal tune point at which the actual video carrier frequency and the reference frequency match. If both slightly differ (shift), tendency of monotonous increasing or monotonous decreasing is shown in response to the shift direction; if both largely differ (shift), saturation occurs above and below the B voltage, resulting in constant voltage. Therefore, if the AFT voltage actually supplied from the video IC 30 is detected and is compared with the B voltage, the shift direction is found.

In the AFT change point detection processing at step S230, frequency data is sent so as to change the reception frequency of the tuner 10 in sequence in minute units to cancel the shift with the synchronizing signal detecting frequency as the start point. Then, even if the synchronizing signal detecting frequency shifts from the normal tune point, the AFT voltage becomes a value close to the B voltage gradually and exceeds the value closest to the B voltage, then again is brought away from the B voltage. Therefore, at the point of time, the shift direction from the normal tune point changes and this point is called AFT change point. That is, determination as to whether or not the AFT change point can be detected is none other than determination as to whether or not the normal tune point can be detected. If it is determined at step S230 that the AFT change point can be detected, control goes to step S240 at which station existence is stored in the corresponding memory position of the EEPROM 70.

On the other hand, if it is not determined at step S220 that the synchronizing signal is supplied from the video IC 30 or if it is not determined at step S230 that the AFT change point can be detected, control goes to step S250 at which whether or not the detection point is the last detection point is determined.

That is, the embodiment assumes that detection of the synchronizing signal at step S220 and detection of the AFT change point at step S230 are executed at several detection points in the surroundings of channel frequency, thus whether or not the detection point is the last detection point is determined at step S250. If the detection point is not the last detection point, control goes to step S260 at which the frequency data at the next detection point is sent to the tuner 10, then control returns to step S220 and similar processing is repeated.

Figure 7:
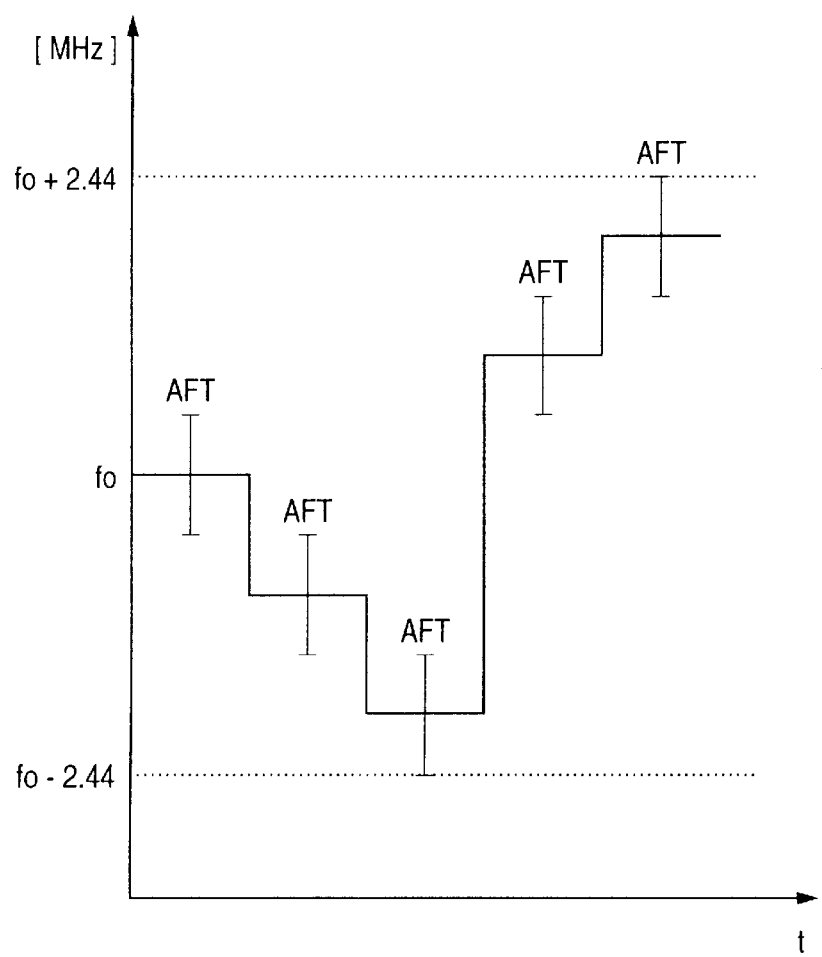
FIG. 7 is a diagram to show frequency transition at the channel presetting time.

In the station existence determination processing, the reception frequency of the tuner 10 makes a transition as shown in FIG. 7. Referring to the figure, it is seen that the AFT scan range covers the range of ±2.44 [MHz] with the channel frequency (f0) as the reference. Therefore, in the station existence determination processing, the presence or absence of a television broadcast signal is detected in the range of channel frequency (f0) ±2.44 [MHz] and if a television broadcast signal exists, station existence is stored in the corresponding memory position of the EEPROM 70.

Returning to the description of the channel preset processing, after the station existence determination processing is executed at step S130, control goes to step S140 at which whether or not the value of the channel variable is equal to 125 is determined. If the value is not equal to 125, control goes to step S150 and the value of the channel variable is incremented by one, then control returns to step S130 and similar processing is repeated. Meanwhile, if it is determined at step S140 that the value of the channel variable is 125, preset processing for all memory positions is now complete.

If it is determined at step S140 that the value of the channel variable is 125, control goes to step S160 at which the memory positions in the range of the channel numbers 14 to 35 are referenced and the number of station-existing channels (X) is calculated.

Referring to the channel plan shown in FIG. 2, it is seen that the CATV broadcast channel numbers 14 (121.25 [MHz]) to 35 (289.25 [MHz]) are a frequency band not assigned to TV broadcasting. Therefore, if an actual television broadcast signal is detected on the frequency band, it means CATV broadcasting; if an actual television broadcast signal is not detected on the frequency band, it means TV broadcasting. The at step S170, the number of channels (X) is compared with a value of 2 with respect to the greater-than, equal-to, or less-than relation. If the number of channels (X) is equal to or greater than 2, the current broadcasting is determined CATV broadcasting and the process is terminated; if the number of channels (X) is less than 2, the current broadcasting is determined TV broadcasting and control goes to step S180 at which TV broadcasting is set on the flag (FLG) and stored in the EEPROM 70.

Since TV broadcasting channel frequencies are not assigned to the frequency band, the value to be compared with the number of channels (X) may be 1 essentially. That is, if the number of channels (X) is equal to or greater than 1, the current broadcasting may be determined CATV broadcasting; if the number of channels (X) is less than 1, the current broadcasting may be determined TV broadcasting. However, there is a possibility that a station-existing channel may be detected on the frequency band because of the effect of noise, etc., although only TV broadcast signals can be received essentially. On the other hand, normally at least two or more CATV broadcast station-existing channels exist on the frequency band, thus the number of channels (X) is compared with 2, whereby erroneous determination as to the television broadcast form is lessened, resulting in further improvement in reliability.

By the way, since the CATV broadcast channel plan is selected in the channel preset processing, if the television broadcasting that can be received on the tuner 10 is TV broadcasting, it appears that no TV broadcast station-existing channels are detected. However, as seen from the TV and CAT broadcast channel plans shown in FIG. 2, the channel frequencies of TV broadcast channel numbers 2 to 13 are the same as those of CATV broadcast channel numbers 2 to 13, so that a station-existing channel in the range is detected reliably.

Figure 8:
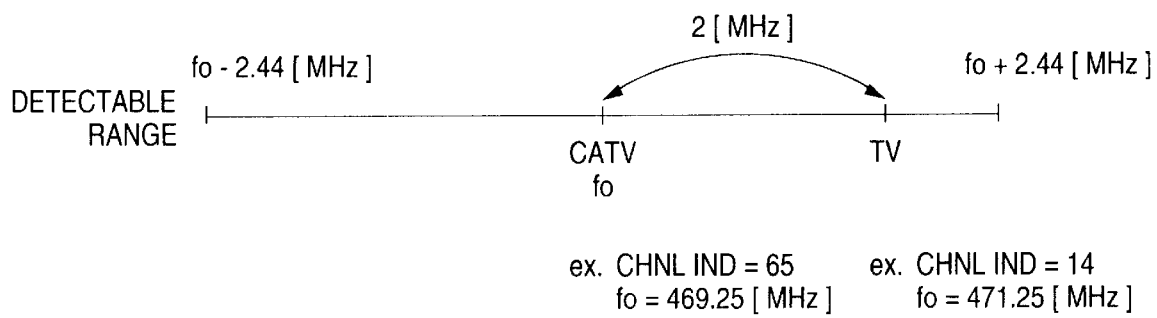
FIG. 8 is a diagram to show the range in which station existence can be detected.

On the other hand, each of the channel frequencies of TV broadcast channel numbers 14 to 69 has a value higher than each of the channel frequencies of CATV broadcast channel numbers 65 to 94 and 100 to 125 by 2 [MHz]. Since the presence or absence of a television broadcast signal can be detected in the range of ±2.44 [MHz] based on each CATV broadcast channel frequency in the above-described station existence determination processing, a television broadcast signal can also be detected reliably with respect to the station-existing channels of the TV broadcast channel numbers 14 to 69. For example, as shown in FIG. 8, if the station existence determination processing is performed for the CATV broadcast channel number 65 (469.25 [MHz]), a television broadcast signal on the TV broadcast channel number 14 (471.25 [MHz]) can be detected sufficiently.

Thus, in the embodiment, a TV broadcast station-existing channel can be detected although the processing is predicated on CATV broadcasting; however, the memory positions in which station existence is stored correspond to the CATV broadcast channel numbers because the processing is predicated on CATV broadcasting. For example, even if the TV broadcast channel number 14 is a station-existing channel in the example shown in FIG. 8, the memory position in which station existence is stored becomes 65. To solve such channel number discrepancy, a technique of shifting the contents of the memory positions corresponding to the channel numbers 65 to 94 and 100 to 125 to the memory positions of the channel numbers 14 to 69 may be adopted. In the embodiment, however, another technique not involving such shifting is adopted and this technique will be discussed below.

If a channel selection command such as channel up or channel down is given from the remote controller 60, etc., the microcomputer 50 makes a reference to the contents of the flag (FLG) stored in the EEPROM 70. As a result, if CATV broadcasting is sensed, the microcomputer 50 makes a reference to the storage contents of the EEPROM 70 and detects the most recent memory position in which station existence is stored. Then, the microcomputer 50 makes a reference to the CATV broadcast channel plan and sends the frequency data corresponding to the channel number corresponding to the detected memory position to the tuner 10 for receiving the channel. To display the channel number on the screen, the microcomputer 50 displays the channel number corresponding to the detected memory position.

Figure 9:
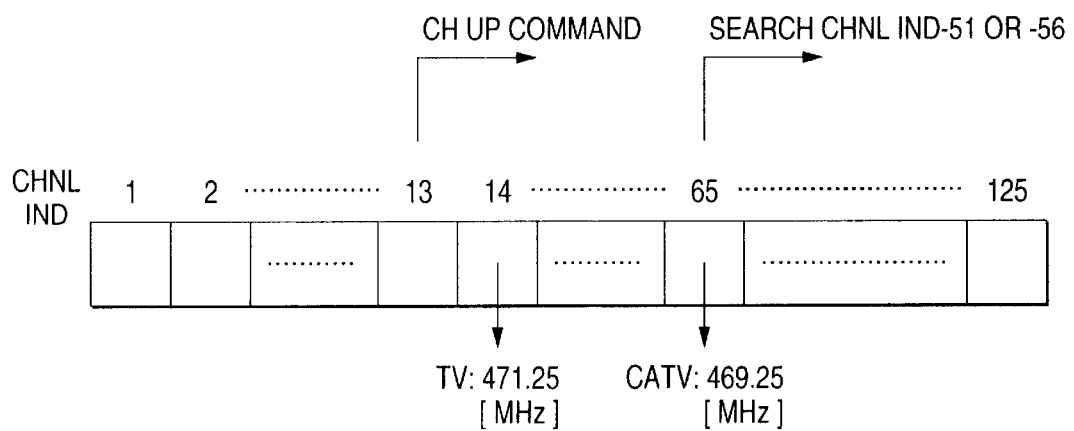
FIG. 9 is a diagram to show the memory position search operation at the channel selection time.

On the other hand, if TV broadcasting is sensed as a result of referencing the flag (FLG) contents, the microcomputer 50 internally converts the memory positions corresponding to the channel numbers 65 to 94 and 100 to 125 into memory positions as the channel numbers 14 to 69 for interpretation. For example, as shown in FIG. 9, if a channel-up command is given in a state in which the TV broadcast channel number 13 is selected, the microcomputer 50 searches for the memory positions corresponding to the channel number 65 corresponding to the TV broadcast channel number 14 and the subsequent channel numbers and detects a memory position in which station existence is stored. Here, the memory positions corresponding to the channel numbers 1, 14 to 64, and 95 to 99 are excluded from the search targets.

If the microcomputer 50 detects a memory position in which station existence is stored from the memory positions corresponding to the channel numbers 65 to 94, the microcomputer 50 subtracts a difference of 51 from the channel number corresponding to the detected memory position and sends the TV broadcast frequency data corresponding to the channel number resulting from the subtraction to the tuner 10 based on the TV broadcast channel plan. To display the channel number on the screen, the microcomputer 50 displays the channel number resulting from the subtraction on the screen.

On the other hand, if the microcomputer 50 detects a memory position in which station existence is stored from the memory positions corresponding to the channel numbers 100 to 125, the microcomputer 50 subtracts a difference of 56 from the channel number corresponding to the detected memory position and sends the TV broadcast frequency data corresponding to the channel number resulting from the subtraction to the tuner 10 based on the TV broadcast channel plan. To display the channel number on the screen, the microcomputer 50 displays the channel number resulting from the subtraction on the screen.

In TV broadcasting, no channels should be assigned to the frequency bands corresponding to the CATV broadcast channel numbers 1, 14 to 64, and 95 to 99. Therefore, if the flag (FLG) is referenced and TV broadcasting is sensed, no memory position in which station existence is stored should exist even if a search is made for the memory positions in the range mentioned above. Thus, it seems that the memory positions in the range need not be excluded from the search targets and that only channel number conversion may be executed. However, it can also be considered that on the frequency bands corresponding to the CATV broadcast channel numbers 1, 14 to 64, and 95 to 99, a memory position in which station existence is stored exists because of the effect of noise, etc., although essentially no stations exist. Therefore, as in the embodiment, if TV broadcasting is sensed, preferably the memory positions corresponding to the channel numbers 1, 14 to 64 and 95 to 99 are excluded from the search targets, whereby the effect of noise, etc., as described above can be excluded.

Next, the operation of the described embodiment is as follows:

When a channel presetting command is given, for example, by depressing an operation button (not shown) of the remote controller 60, a predetermined infrared remote control signal is sent from the remote controller 60 and the microcomputer 50 senses the signal and performs the channel preset processing. The channel preset processing assumes that CATV broadcasting can be received. First, as initialization, the CATV broadcast channel plan is selected and CATV broadcasting is set on the predetermined flag (FLG) and stored in the EEPROM 70 (step S110).

Then, channels 1 to 125 are tuned on the tuner 10 in order based on the CATV broadcast channel plan and whether or not each channel is a station-existing channel is determined based on the presence or absence of a synchronizing signal from the video IC 30 and the AFT voltage from the VIF circuit 20. If the channel is determined a station-existing channel, station existence is stored in the corresponding memory position of the EEPROM 70 (steps S120 to S150). To determine whether or not each channel is a station-existing channel, if a television broadcast signal can be detected in the range of ±2.44 [MHz] with each channel frequency as the reference, the channel is determined a station-existing channel.

Upon completion of presetting all CATV broadcast channels, the memory positions corresponding to the channel numbers 14 to 35 are referenced in sequence and the number of station-existing channels (X) is calculated (step S160). The number of channels (X) is compared with a value of 2 with respect to the greater-than, equal-to, or less-than relation (step S170). If the number of channels (X) is equal to or greater than 2, the channel preset processing is terminated; otherwise, TV broadcasting is set on the flag (FLG) and stored in the EEPROM 70, then the channel preset processing is terminated (step S180).

After the channel presetting is thus completed, if a channel up or channel down command is given from the remote controller 60, etc., a predetermined infrared remote control signal is sent from the remote controller 60 and is sensed by the microcomputer 50, which then makes a reference to the contents of the flag (FLG) stored in the EEPROM 70 and senses which of CATV and TV broadcast signals can be received. If CATV broadcasting is sensed, the microcomputer 50 detects the most recent memory position in which station existence is stored, and sends the frequency data corresponding to the channel number corresponding to the detected memory position to the tuner 10 based on the CATV broadcast channel plan, and the tuner 10 receives the television broadcast signal on the channel corresponding to the frequency data accordingly.

On the other hand, if TV broadcasting is sensed, the microcomputer 50 internally converts the memory positions corresponding to the channel numbers 65 to 94 and 100 to 125 into memory positions as the channel numbers 14 to 69 for interpretation. For example, as shown in FIG. 9, if a channel-up command is given in a state in which the TV broadcast channel number 13 is selected, the microcomputer 50 searches for the memory positions corresponding to the channel number 65 corresponding to the TV broadcast channel number 14 and the subsequent channel numbers and detects a memory position in which station existence is stored.

If the microcomputer 50 detects a memory position in which station existence is stored from the memory positions corresponding to the channel numbers 65 to 94, the microcomputer 50 subtracts a difference of 51 from the channel number corresponding to the detected memory position and sends the frequency data corresponding to the channel number resulting from the subtraction to the tuner 10 based on the TV broadcast channel plan. On the other hand, if the microcomputer 50 detects a memory position in which station existence is stored from the memory positions corresponding to the channel numbers 100 to 125, the microcomputer 50 subtracts a difference of 56 from the channel number corresponding to the detected memory position and sends the frequency data corresponding to the channel number resulting from the subtraction to the tuner 10 based on the TV broadcast channel plan. Then, the tuner 10 receives the television broadcast signal on the channel corresponding to the frequency data.

Thus, if the tuner 10 can receive the signal of the television broadcast form of either television wave broadcasting or CATV broadcasting, the microcomputer 50 executes channel preset processing so that signals of television wave broadcasting can also be received although the processing is predicated on CATV broadcasting, then determines signals of which television broadcast form can be receive. If the microcomputer 50 determines that tie signals of the television wave broadcasting can be received, it makes a reference to the memory positions of the preset contents. To cause the tuner 10 to receive a station-existing channel, the microcomputer 50 matches the target memory position with the channel of television wave broadcasting for receiving the channel. Thus, a television receiver which requires only one channel search and can decrease the time required for the channel presetting can be provided.

As described above, in the invention, after channel presetting is executed so that the signals of the first television broadcast form can also be detected although the channel presetting is predicated on the second television broadcast form, signals of which television broadcast form can be received is determined. If it is determined that the signals of the first television broadcast form can be received, to cause a station-existing channel to be received based on the preset contents, the target memory position is matched with the channel of the first television broadcast form for receiving the channel. Thus, a television receiver which requires only one channel search and can decrease the time required for the channel presetting can be provided.

What is claimed is:

1. A television receiver comprising:

signal reception means for receiving input from a first television broadcast form and input from a second television broadcast form and outputting a signal of any desired frequency in response to said first television broadcast form in which predetermined channel frequencies are assigned in at least one frequency band and in response to said second television broadcast form in which groups of channel frequencies of said second television broadcast form are assigned to a specific frequency band not assigned as one of said at least one frequency band in the first television broadcast form although the same channel frequencies as, or channel frequencies close to the channel frequencies assigned to the first television broadcast form, are assigned;

reception instructions means for instructing said signal reception means to receive a signal of each channel frequency in response to the second television broadcast form;

station existence determination means for substantially continuously changing the reception frequency of said signal reception means on a frequency band containing the channel frequencies in the first television broadcast form close to each channel frequency specified by said reception instruction means and determining whether or not a station exists based on the output;

channel memory means having as many memory positions as the number of channels in the second television broadcast form for storing the determination result of said station existence determination means in the corresponding memory position;

television broadcast form determination means for determining which of a signal in the first television broadcast form and a signal in the second television broadcast form can be received based on the determination result of said station existence determination means as to each channel within the specific frequency band assigned only to the second television broadcast form after completion of storage processing for all memory positions in said channel memory means; and reception control means, to cause said signal reception means to receive a station-existing channel based on the storage contents of said channel memory means, if said television broadcast form determination means determines that a signal in the first television broadcast form can be received, said reception control means matching the station-existing channel with the channel in the first television broadcast form and causing said signal reception means to receive the channel.

2. The television receiver as claimed in claim 1, wherein the first television broadcast form is ground wave broadcasting and the second television broadcast form is cable television broadcasting.

3. The television receiver as claimed in claim 1, further comprising:

synchronization detection means for detecting the presence or absence of a synchronizing signal based on output of said signal reception means; and ATF pulling-in means for roughly continuously changing the reception frequency of said signal reception means on a predetermined frequency band and pulling into a normal tune point based on erroneous voltage responsive to a difference between video carrier frequency and reference frequency based on output of said signal reception means, wherein to determine whether or not a station exists, if said synchronization detection means can detect a synchronizing signal and said AFT pulling-in means can pull into the normal tune point, it is determined that a station exists.

4. The television receiver as claimed in claim 3, wherein said station existence determination means changes the reception frequency of said signal reception means in predetermined step units on a predetermined frequency band based on each channel frequency specified by said reception instruction means and uses said synchronization detection means and said AFT pulling-in means at each reception frequency to determine whether or not a station exists.

5. The television receiver as claimed in claim 1, wherein said television broadcast form determination means compares the number of channels each determined a station-existing channel by said station existence determination means on specific frequency band not assigned in the first television broadcast form with a predetermined constant with respect to greater-than, equal-to, or less-than relation, thereby determining which television broadcast form can be received.

6. The television receiver as claimed in claim 1, wherein if said television broadcast form determination means determines that a signal involved in the first television broadcast form can be received, when causing said signal reception means to receive a station-existing channel, said reception control means senses the memory position to which the channel to be received corresponds actually, and determines whether or not the channel is a station-existing channel based on the storage contents of the memory position.

* * * * *